No. 703,744. Patented July 1, 1902.
A. A. SCOTT.
ELEVATING TRUCK.
(Application filed Nov. 14, 1901.)

(No Model.)

Witnesses  Inventor
 Alexander Anderson Scott
 by D. A. Gowrick
 Attorney

UNITED STATES PATENT OFFICE.

ALEXANDER ANDERSON SCOTT, OF KNOXVILLE, TENNESSEE.

ELEVATING-TRUCK.

SPECIFICATION forming part of Letters Patent No. 703,744, dated July 1, 1902.

Application filed November 14, 1901. Serial No. 82,275. (No model.)

*To all whom it may concern:*

Be it known that I, ALEXANDER ANDERSON SCOTT, a citizen of the United States, residing at Knoxville, in the county of Knox and State of Tennessee, have invented certain new and useful Improvements in Elevating-Trucks, of which the following is a specification.

My invention relates to devices for transporting heavy objects from one place to another, and more especially to conveying pallets of bricks from the machine where the bricks are shaped to the drying-racks, and has for one of its objects to reduce the cost of brick-making by reducing the amount of labor necessary to make a finished brick. In brickmaking it has been the usual custom until issue of my Patent No. 671,452, of April 9, 1901, to convey the pallets of bricks from the machine to the drying-racks on ordinary trucks, with no provision for releasing the pallet of bricks from the truck, and thus requiring at least two men to raise the pallet from the truck and transport it to the drying-racks. By means of the mechanism employed in my aforesaid patent one man is enabled to perform the work that before required two or more.

Another object of the invention, set out hereinafter, is to reduce the number of working parts in an elevating-truck, as shown in my former patent, and lessen the cost of construction.

Other advantages of my invention will more fully appear by reference to the following description and the accompanying drawings, in which—

Figure 1:
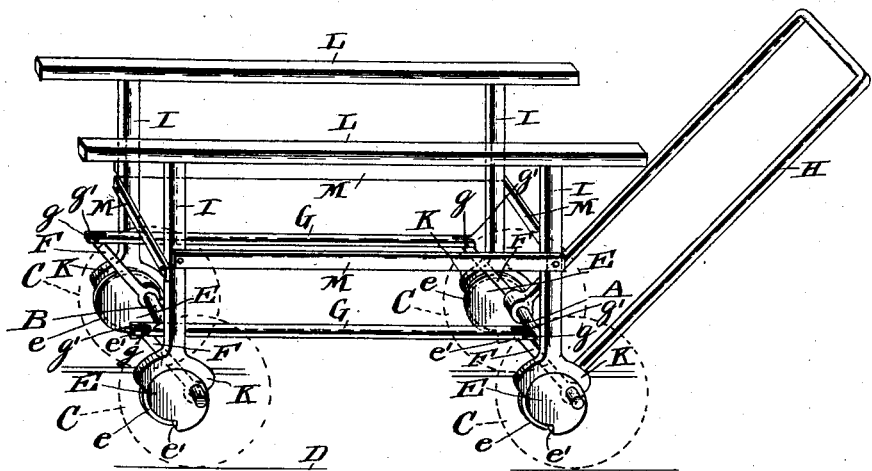
Figure 2:
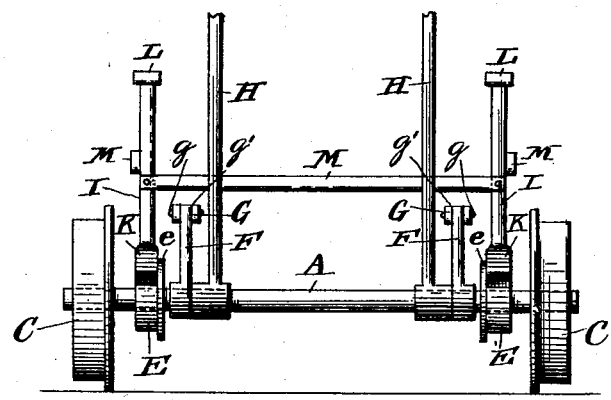
Figure 3:
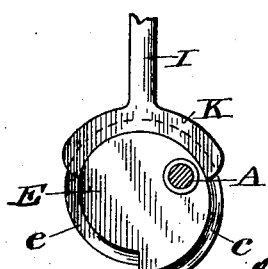

Figure 1 is a view in perspective of my invention; Fig. 2, a front end view in elevation, and Fig. 3 a detail view of a cam and an arm.

Referring to the drawings, in which similar reference characters indicate corresponding parts throughout the several views, A represents the front axle of my truck, B the rear axle, while C indicates the wheels journaled thereon. The wheels C are preferably made of the car-wheel type and are to be used on a track D, as shown, though an ordinary flat-rimmed wheel may be substituted where tracks are not employed. Keyed to the axles A and B are the four cams indicated by E, which are flanged toward the center of the axle, as shown at $e$, and have the shoulder $e'$, the purpose of which will more fully appear hereinafter. Just inside of each cam is an arm F, secured to the axles A and B in the same relationship to the cams E, the upper ends of the pair of arms on each side of the truck being connected by the rod G, pivoted to said arms by means of the bolts $g$, each end of the rod G being slotted, as shown at $g'$, to receive the end of the arm F.

H is the handle by which the truck is either pulled or pushed, and being keyed to the front axle A also serves as a lever to turn the cams E, the cams on the rear axle being turned simultaneously with the cams on the front axle through the connecting-rods G and the arms F.

The body of the truck is made up of the four legs I, having the segmental bases K integral with or secured to said legs by any suitable means, the beams L, forming the platform of the truck, and the side and end braces M. The segmental bases K are adapted to rest on the cams E, as shown, and ride thereon when the cams are turned by means of the lever H. The shoulders $e'$ by bearing against the end of the segmental bases K when the wide part of the cam is uppermost prevent the lever H becoming further depressed, and thus holds it at a convenient height for pushing or pulling the truck. It is also apparent that the rods G may be used as the platform of a lower truck, if desired, either in connection with the truck-body above described or to its exclusion.

The operation is as follows: The truck is run under its load, the handle or lever H being raised toward a vertical position to lower the truck-body sufficiently to pass under the load. By lowering the handle or lever H the truck-body is raised and the load lifted from its support. When the destination of the load has been reached, the truck-body is lowered by raising the lever H and the pallet of bricks or other load deposited on a suitable support.

Having thus described my invention, what I claim is—

1. In an elevating-truck, wheels journaled on the axles, cams keyed to the axles between said wheels, means to cause the operation of said cams simultaneously, and a platform having legs constructed to ride on said cams, substantially as shown and described.

2. In an elevating-truck, cams keyed to the front and rear axles having a flange and shoulder, means to cause a simultaneous oscillation of said cams, and a separable platform having legs constructed to ride on said cams, substantially as shown and described.

3. In an elevating-truck, the platform consisting of parallel horizontal beams, legs attached to said beams, segmental bases fixed to said legs, and means attached to the axles of the truck for raising and lowering said platform, substantially as shown and described.

4. In an elevating-truck, flanged cams keyed to the front and rear axles, arms keyed to said front and rear axles and pivotally connected to horizontal rods, and a platform having legs adapted to ride said cams, substantially as shown and described.

5. In an elevating-truck, cams keyed to the axles, a lever-handle fixed to the front axle, rocking arms fixed to the axles and connected by rods pivoted thereto, a platform having vertical legs, and segmental bases on said legs to ride on said cams, substantially as shown and described.

6. In an elevating-truck, a platform having parallel horizontal beams, legs fixed to said platform having segmental bases, cams keyed to the axles to receive said segmental bases, a shoulder on each cam to strike against the segmental base and limit the movement of the cam in raising the platform, a rocking frame secured to said axle, a lever-handle secured to one axle, and wheels journaled on said axles, substantially as described.

In testimony whereof I hereto affix my signature in the presence of two witnesses.

ALEXANDER ANDERSON SCOTT.

Witnesses:
S. MONTGOMERY SMITH,
A. A. SCHMID.